July 12, 1960
F. W. FENTON
2,944,702
PALLET UNLOADING MACHINE
Filed March 12, 1956
7 Sheets-Sheet 1
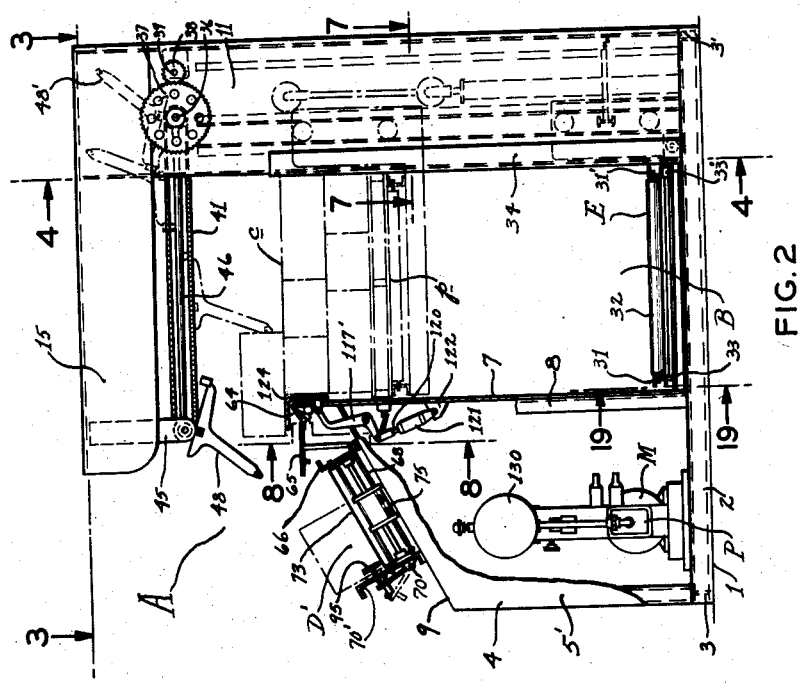
INVENTOR.
FRANK W. FENTON
BY
ATTORNEY

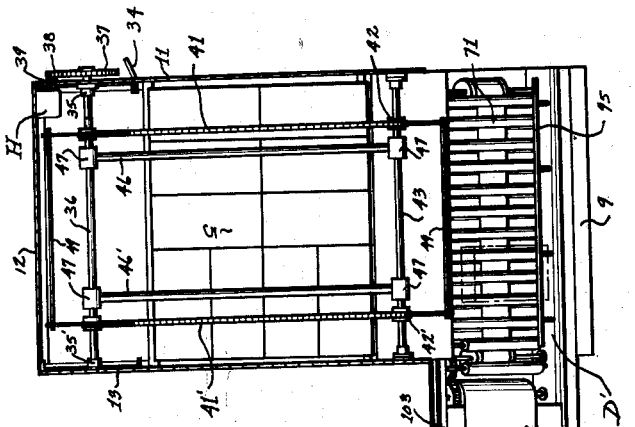

July 12, 1960  F. W. FENTON  2,944,702
PALLET UNLOADING MACHINE
Filed March 12, 1956  7 Sheets-Sheet 3
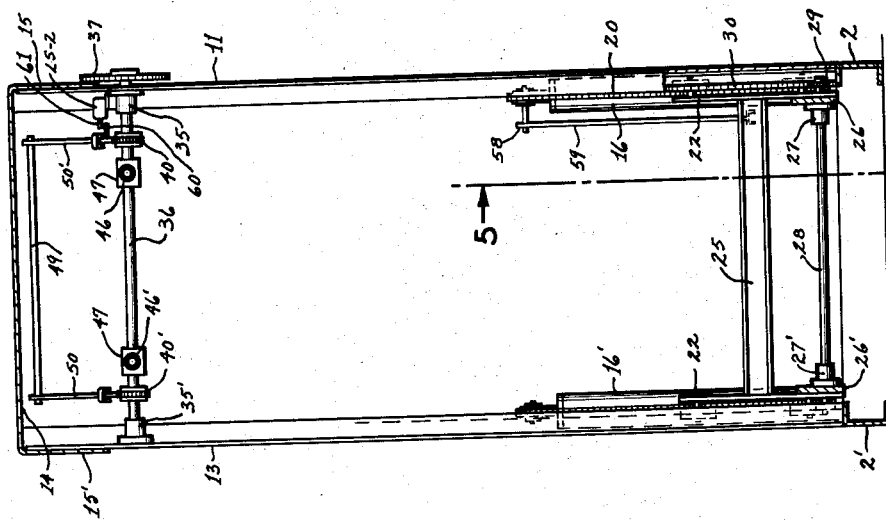
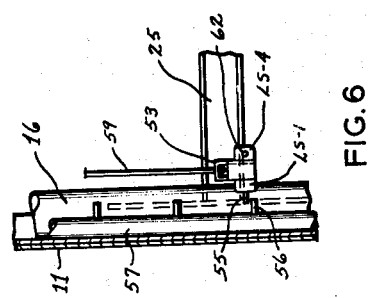
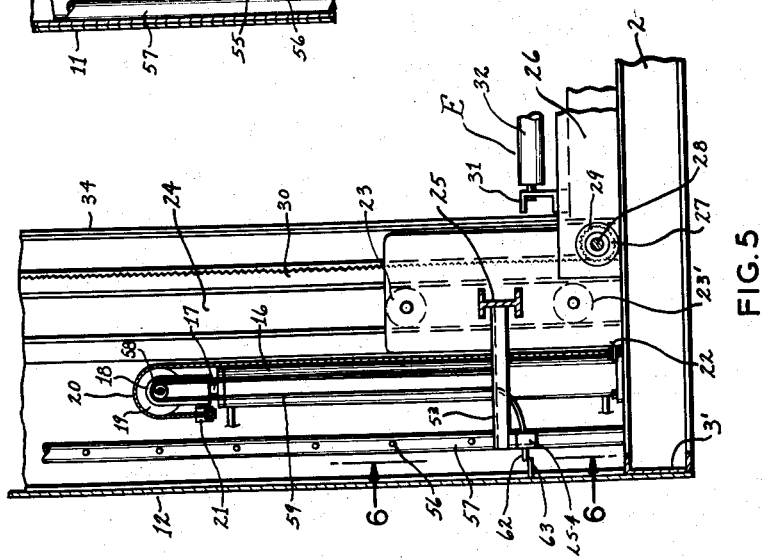
INVENTOR.
FRANK W. FENTON
BY Ralph W. Kalish
ATTORNEY July 12, 1960  F. W. FENTON  2,944,702
PALLET UNLOADING MACHINE
Filed March 12, 1956  7 Sheets-Sheet 4
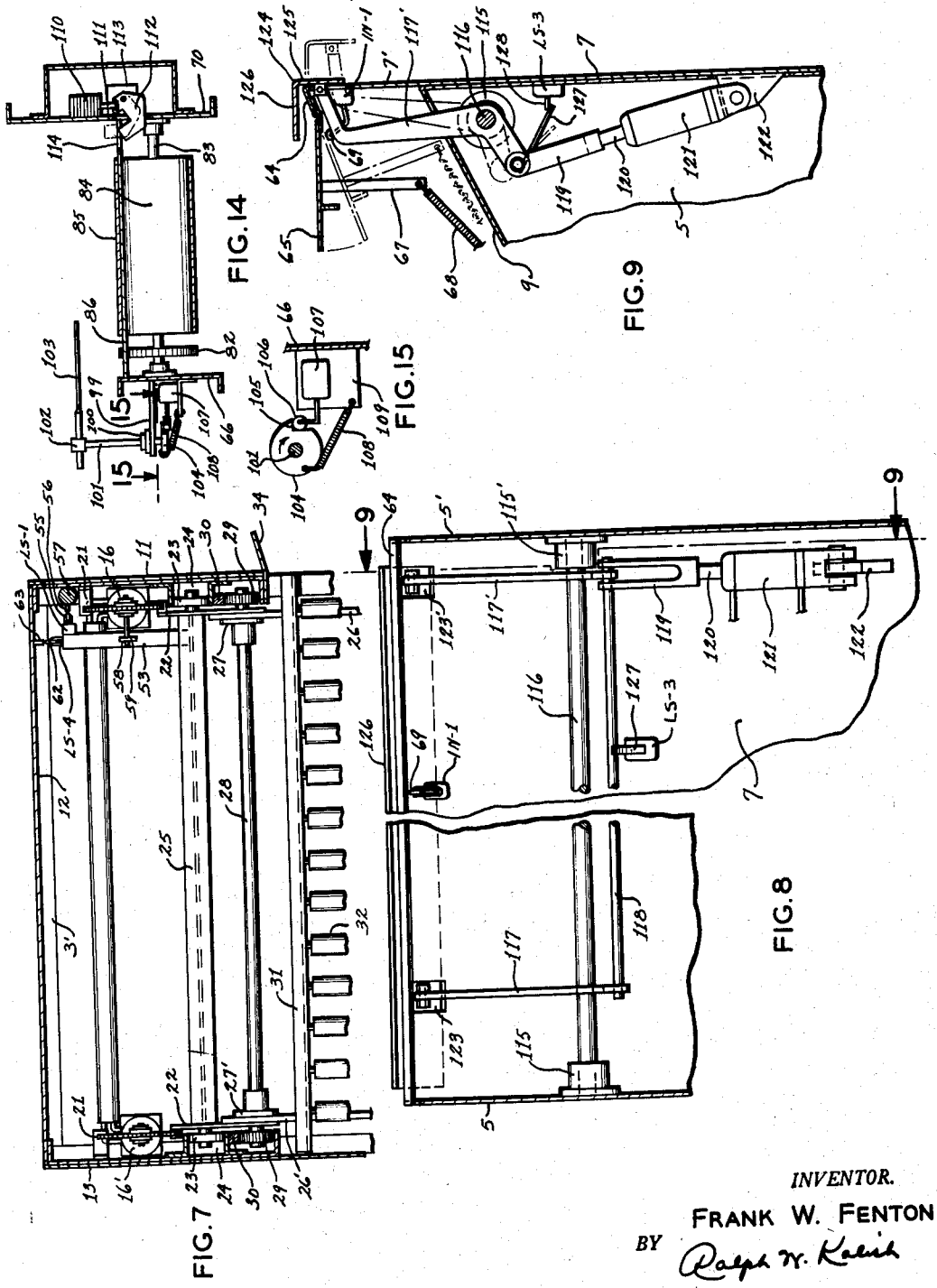
INVENTOR.
FRANK W. FENTON
BY Ralph N. Kalish
ATTORNEY July 12, 1960 F. W. FENTON 2,944,702
PALLET UNLOADING MACHINE
Filed March 12, 1956 7 Sheets-Sheet 5
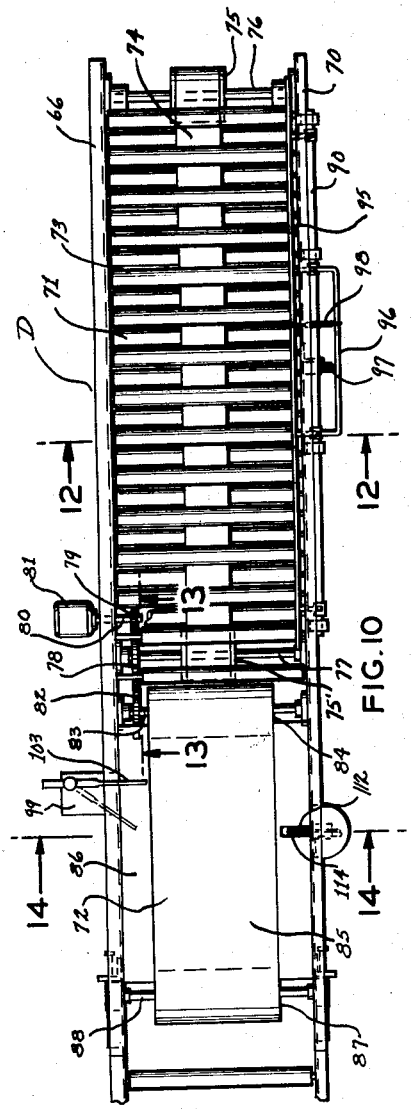
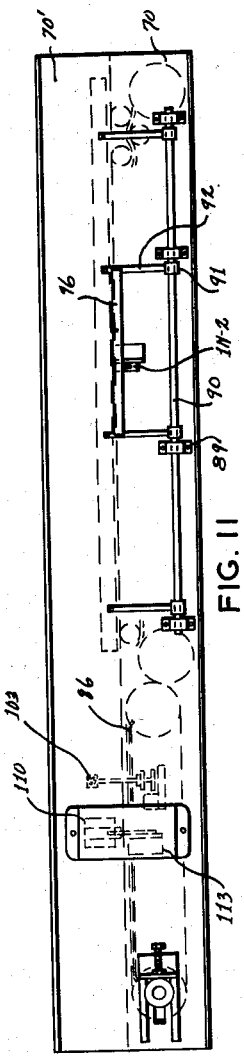
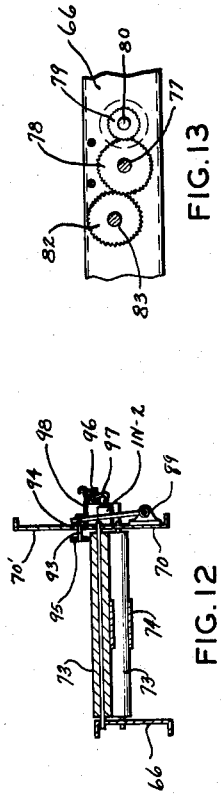
INVENTOR.
FRANK W. FENTON
BY
ATTORNEY

INVENTOR.
FRANK W. FENTON

July 12, 1960     F. W. FENTON     2,944,702
PALLET UNLOADING MACHINE
Filed March 12, 1956     7 Sheets-Sheet 7
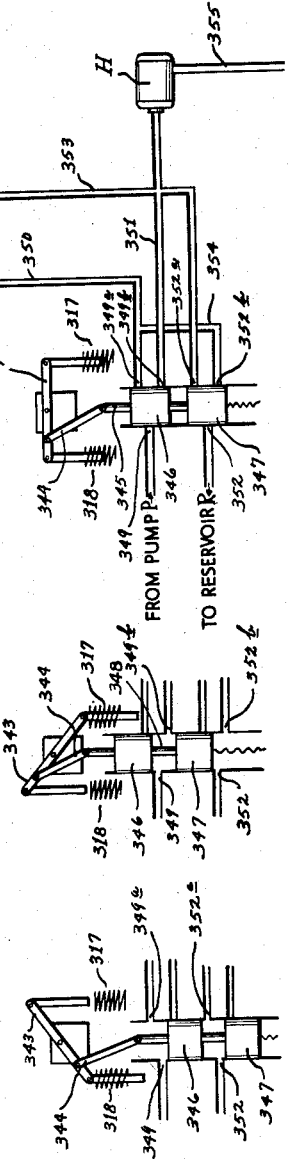
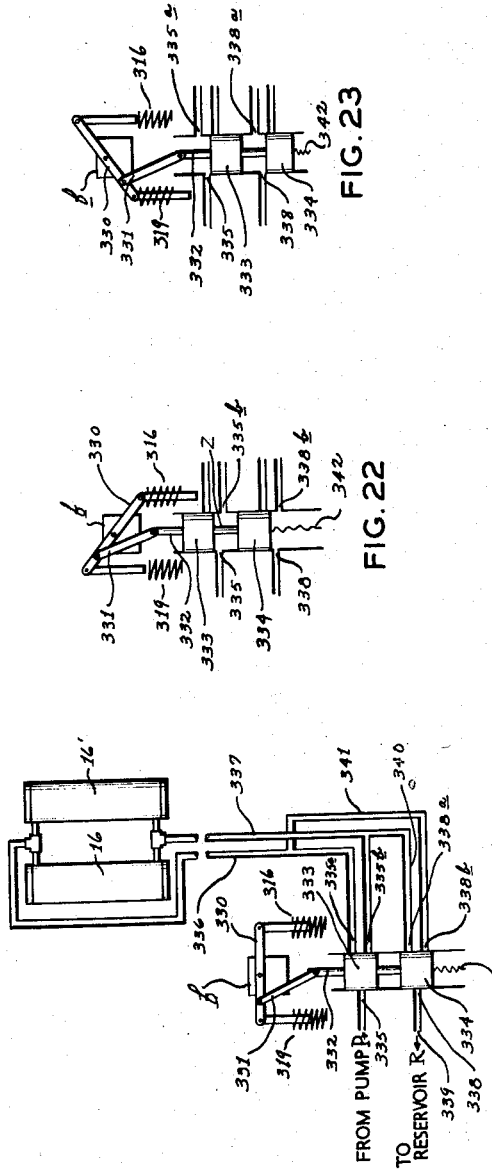
INVENTOR.
FRANK W. FENTON
ATTORNEY

United States Patent Office 2,944,702
Patented July 12, 1960

2,944,702

PALLET UNLOADING MACHINE

Frank W. Fenton, Lemay, Mo., assignor to Beacon Production Equipment Corporation, Centreville Township, a corporation of Illinois Filed Mar. 12, 1956, Ser. No. 571,058

20 Claims. (Cl. 221—13)

This invention relates in general to materials handling equipment, and more particularly, to a pallet unloading machine.

The use of loading pallets for all types of merchandise has now become a most commonplace expedient in industry, such pallets being adapted for ready handling by forklift trucks and hence providing a support platform for a full load which can be easily transported from point to point. Heretofore, many efforts have been made for the automatic loading of pallets, that is, the stacking of articles thereon in a prearranged manner, so as to obviate the need of manual labor for such purpose. However, in certain industries there has developed the need for the automatic unloading of articles and the like from pallets. A particular example is the beverage industry wherein empty bottles are continuously returned to the bottling companies in cartons. As such cartons are received from the various returning agencies the same are manually stacked upon pallets for easy handling. At the plant said cartons must be removed from the pallet so that the bottles may in turn be withdrawn therefrom for cleansing and refilling. Up to the present such pallets have been unloaded manually causing a considerable labor cost as well as the attendant expenditure of time. There are other numerous industries which require the unloading of pallets, but the reference to the beverage industry has been cited merely for exemplary purposes.

Also, in conjunction with the loading of pallets there have developed various article arrangements, so as to create what is termed in industry, "a locked load." This has reference to articles of a non-cubic character, disposed in tiers, wherein certain of the articles in one tier are disposed at 90° to other articles in the same tier, with the adjacent upper and lower tiers having a reverse pattern so as to render the load cohesive and unitary. The variety of patterns to create locked loads are myriad. Consequently, in the unloading of pallets containing cartons and the like in locked patterns, the particular disposition of the various cartons must be taken into consideration so that the same will be properly presented after unloading.

Therefore, it is a primary object of the present invention to provide a machine which will automatically unload a fully loaded pallet.

It is another object of the present invention to provide a pallet unloading machine which is adapted to unload pallets supporting articles and the like stacked in any number of tiers and which machine will effectively accommodate such articles as arranged in locked patterns.

It is an additional object of the present invention to provide a pallet unloading machine having unique means for preventing obstruction, such as jamming and the like, of the articles as the same are unloaded.

It is another object of the present invention to provide a pallet unloading machine which contains unique means for effecting the turning of articles removed from the pallet so that all articles delivered from the machine will be presented in the same manner.

It is another object of the present invention to provide a pallet unloading machine which incorporates means for stabilizing the load as articles are removed therefrom.

It is a still further object of the present invention to provide a pallet unloading machine which is adapted to operate in a fully efficient, reliable, automatic manner, having unique control means for effecting timed sequential operation of the various parts thereof.

It is an additional object of the present invention to provide a pallet unloading machine which may be economically produced; which is so constructed as to be resistant to breakdown; which can unload pallets in minimum time; and which is durable in usage.

These and other detailed objects are obtained by the structures illustrated in the accompanying drawings (seven sheets) in which—

Figure 1 is a front end view of a pallet unloading machine constructed in accordance with and embodying the present invention.

Figure 2 is a side view of the machine.

Figure 3 is a top plan view of the machine.

Figure 4 is a vertical transverse section taken on the line 4—4 of Figure 2.

Figure 5 is a vertical transverse section taken on the line 5—5 of Figure 4.

Figure 6 is a fragmentary vertical section taken on the line 6—6 of Figure 5.

Figure 7 is a horizontal transverse section taken on the line 7—7 of Figure 2.

Figure 8 is an enlarged vertical section taken on the line 8—8 of Figure 2.

Figure 9 is a vertical transverse section taken on line 9—9 of Figure 8.

Figure 10 is an enlarged, top plan view of the discharge conveyor.

Figure 11 is a front view of the discharge conveyor.

Figure 12 is a vertical transverse section taken on the line 12—12 of Figure 10.

Figure 13 is a vertical transverse section taken on the line 13—13 of Figure 10.

Figure 14 is a vertical transverse section taken on the line 14—14 of Figure 10.

Figure 15 is a horizontal transverse section taken on the line 15—15 of Figure 14.

Figure 16 is an enlarged side view of a carton stripper carrier.

Figure 17 is a vertical transverse section taken on the line 17—17 of Figure 16.

Figure 18 is a view taken on the line 18—18 of Figure 16.

Figure 19 is a vertical transverse section taken on the line 19—19 of Figure 2.

Figure 20:
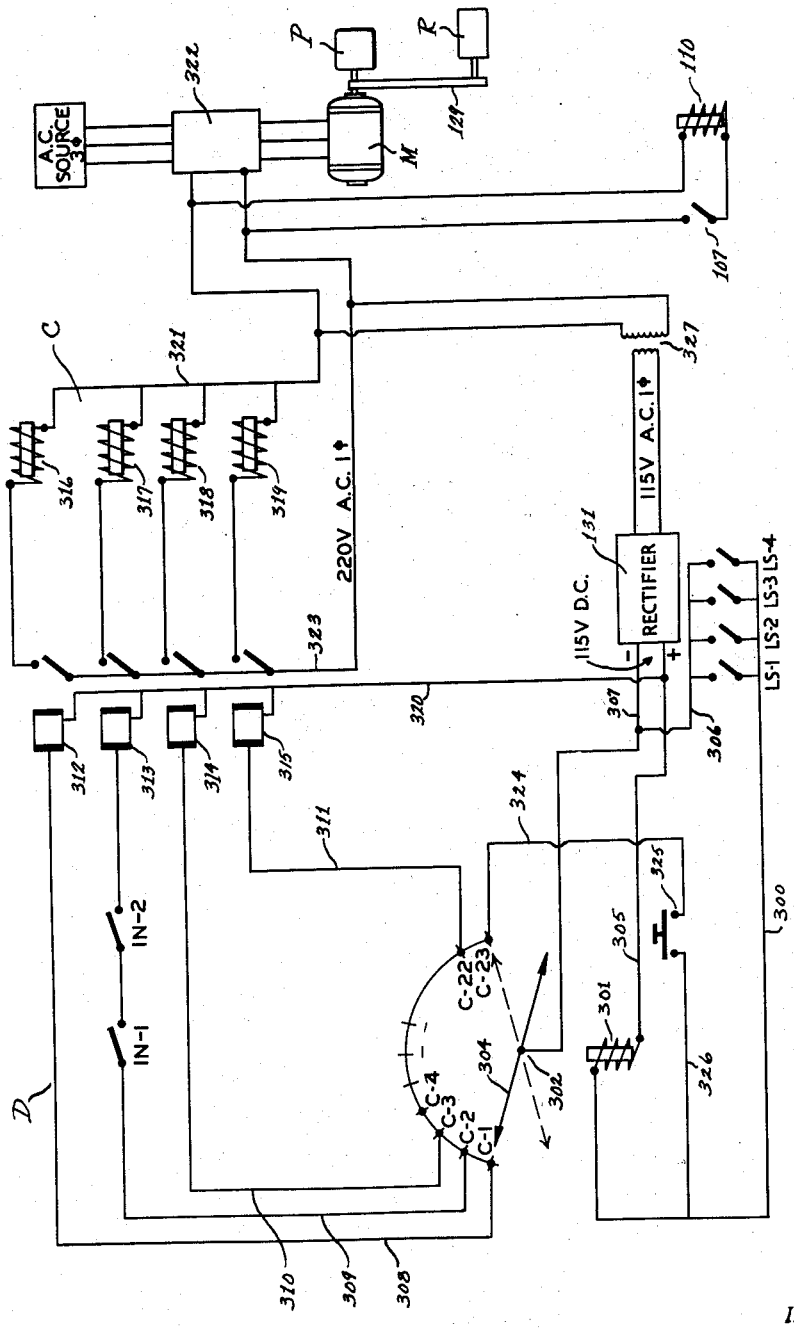
Figure 20 is a wiring diagram of the circuit for operating the machine.

Figures 21, 22, and 23 schematically illustrate the operation of the system for the elevator fluid cylinders.

Figures 24, 25 and 26 schematically illustrate the operation of the system for the stripper assembly motor and clamping bar fluid cylinder.

In essence the present invention comprises a machine for receiving a fully loaded pallet $p$ having cartons in multi-tier arrangement. It is to be understood in the present instance that such pallets may have loads of various types of articles other than specifically cartons, but herein the load elements will be shown as non-cubic cartons for illustrative purposes only, and hence to facilitate comprehension as to the versatility of the machine. The machine is adapted to effect transfer of the cartons from the pallet onto a discharge conveyor so that the load is thus reduced to its unit constituents for ultimate processing and handling. The cartons are removed from the uppermost tiers downwardly and delivered to the conveyor by rows. After the top tier has been stripped from the load, the pallet is elevated to present the next tier into position for carton removal. The discharge conveyor is inclined transversely so that the cartons received thereon will be displaced downwardly from the next succeeding row to prevent any untoward interfering or impeding contact therebetween. Incorporated in the discharge conveyor is a carton turning unit so that all cartons travelling from the discharge conveyor will be axially aligned for transfer to a delivery conveyor.

It should be noted that it is present practive to stack non-cubic cartons and like articles on pallets in what is called a "locked formation" wherein one tier will contain several cartons arranged in axial normal relationship to the remaining cartons, with the adjacent upper and lower tiers having a reversed pattern, with the total load assuming a cohesive, well-knit unit. The machine of this invention is adapted to handle pallets having cartons arranged in any particular locked formation.

In the drawings which illustrate the preferred embodiment of the present invention, A refers to a pallet unloading machine having a rectangular base frame 1 comprised of parallel side and end members 2, 2' and 3, 3', respectively, as of I beams or channels. Provided upon base frame 1 at the front end thereof is a housing 4 having side walls 5, 5', a front end wall 6 and a rearward end wall 7, which is of greater height than said front end wall 6; there being a plurality of uprights 8 welded to the base frame 1 for supporting said housing walls. Extending upwardly and rearwardly from the upper edge of housing front wall 6 is a top wall 9, the rearward edge portion being secured to the forwardly presented face of housing wall 7 at a point beneath its upper end thereby defining a projecting section 7' of said wall 7. The degree of inclination to the horizontal of top wall 9 is preferably approximately 22°.

Mounted on frame side member 2 spacedly from housing side wall 5' to define therebetween an infeed opening B is a narrow, vertical panel or plate 11 of suitable sheet stock extending upwardly above housing 4 and being secured, as by welding, along its rearward side edge to the adjacent margin of a backing plate 12, which at its opposite side edge is fixed to a side plate 13. Said plate 13 at its lower end is secured rigidly to base frame member 2' and along its lateral forward margin is secured to housing wall 5. Fixed upon said plates 11, 13 and backing plate 12, and at their upper edges, is a top plate 14, with depending side skirts 15, 15' for defining a hood-forming structure which terminates just forwardly of, and spacedly above, housing rear wall 7. The portion of machine A immediately rearwardly of housing rear wall 7 constitutes an elevator well, one side of which is determined by side plate 13 and the opposite of which is open at B for the feeding therethrough of loaded pallets onto an elevator E adapted for reciprocal vertical travel in said elevator well.

On the inner faces of side plates 11, 13 are aligned vertically disposed elevator fluid cylinders 16, 16', respectively, the lower ends of which are supported on frame side members 2, 2'; each cylinder 16, 16' having a piston 17, which at its upper end is provided with a clevis-type mounting 18 for a sprocket 19 about which is trained a chain 20. One end of each chain 20 is fixed to a bracket 21 on the inner face of the proximate side plate, while the other end is suitably secured to the rearward edge of the adjacent lateral plate 22 of elevator E. Each lateral plate 22 carries, as by studs, a pair of vertically arranged rollers 23, 23' (see Figure 5) for travel along guideways or roller channels 24 provided on the inner face of the related side plate. Said elevator lateral plates 22 are interconnected by a transverse member 25 welded at its ends to the inwardly directed faces of said lateral plates. Projecting forwardly or lengthwise of frame 1 from each lateral plate 22, and being fixed at one of their ends thereto, are parallel arms 26, 26' which at their forward ends terminate in immediate adjacency to housing rear wall 7; said arms 26, 26' being presented inwardly of frame side members 2, 2' respectively. On their inward faces arms 26, 26' in their rear portions have mounted thereon aligned bearings 27, 27' respectively, for journaling of a shaft 28 which projects through lateral plates 22 and has keyed or otherwise secured on each of its extended ends a pinion 29 meshing with a rack 30 provided on the inner face of side plates 13, 11; said racks 30 and pinions 29 coacting to stabilize elevator E during operation thereof.

Carried upon arms 26, 26' and constituting the load receiving surface of elevator E is a rollered platform comprising a pair of parallel, transversely extending side elements 31, 31' within which are journaled the ends of a plurality of horizontally spaced apart, rotatable friction rollers 32; said side elements 31, 31' extending at their ends beyond arms 26, 26' for normal overlying relationship with respect to frame side members 2, 2'. Side elements 31, 31' at one of their ends are suitable hingedly engaged to arm 26', as at $h$ (see Figure 19), and at their opposite ends are unattachedly supported upon the upper edge of arm 26 so that the platform will be swingable about its end remote from opening B. When elevator E is in lowered or full downward position arms 26, 26' will be presented adjacent frame side members 2, 2', with the free ends of side elements 31, 31' being brought into supported engagement upon stops 33, 33' respectively fixed on frame member 2 within the opening B, which will have caused the platform to assume an inclined attitude, with the other ends, being pivoted about the hinged engagement with arm 26', for gravity impelled movement of pallets thereacross from the feed opening B.

Extending laterally outwardly from the forward edge of rearward side plate 11 is a flared pallet guide plate 34 for directing of loaded pallets through opening B and onto elevator E.

Mounted on side plates 11 and 13, toward the upper ends thereof, are aligned bearings 35, 35', respectively, for journaling therein of a shaft 36 extending transversely therebetween; one end of said shaft 36 projects outwardly of side plate 11 and has keyed or otherwise secured thereon a speed reduction gear 37 meshing with a drive gear 38 carried on the drive shaft 39 of an hydraulic motor H. Fixed on shaft 36 adjacent bearings 35, 35' are sprockets 40, 40', respectively, about which are trained the rearward end portions of parallel, endless chains 41, 41' respectively, the forward portions of which are passed about sprockets 42, 42' respectively, mounted upon an idler shaft 43, journaled at its ends in bearings 44, 44' carried at the lower ends of bearing arms 45, 45' respectively, secured to hood side skirts 15, 15', respectively, and depending downwardly below the forward end portions thereof; said shafts 36 and 43 being in axial parallel, planar aligned relation (see Figures 2 and 3). Extending between shafts 36 and 43, and axially normal thereto is a pair of spaced apart stabilizing rods 46, 46' the ends of which are received in sleeves 47 engaged upon said shafts.

Carried upon endless chains 41, 41' is a pair of carton strippers 48, 48' spaced apart by half the length of said chains 41, 41' so that the same are presented at correspondingly opposite points thereon. Each carton stripper 48, 48' comprises a carton-engaging cross rod 49 secured at its end in the lower ends of normally downwardly inclined carriers 50, 50' which in their upper central portions are pivotally engaged to a cleat 51, mounted on the associated chain 41, 41' so that said carriers 50, 50' are swingable thereabout. At their upper rearward end said carriers 50, 50' each mount a U-shaped member 52 through which the related chain 41, 41' will pass, and the base of which member 52 engages said chains to limit swinging of the carton stripper and hence, stabilize the same under forces applied to cross rod 49, as by cartons being engaged thereby.

The upper edge of the forward portion of carriers 50, 50' will be presented for stop-wise engagement with the associated chains 41, 41' so as to limit swinging of carton strippers 48, 48' in the other direction; and being primarily engageable with chains 41, 41' in their upper courses as the carton strippers 48, 48' are being moved on the return or non-operative portion of the cycle.

Mounted on elevator E for movement therewith, as upon a relatively short arm 53 projecting rearwardly from transverse member 25 is a limit switch LS-1 having a trigger 55 (see Figure 6) for sequentially engaging a series of vertically aligned lugs 56 mounted upon a post 57 secured to the inner face of side plate 11 for effecting periodic stoppage of elevator E during its upper travel, for purposes, and in a manner, more fully described hereinbelow; there being a sheave 58 mounted upon the member 18 of the adjacent piston 17 for training thereabout of a conductor 59 for said switch LS-1 so that connection is provided thereto during travel of elevator E.

Projecting laterally from each carrier 50, 50' of carton strippers 48, 48' is a lug 60 for engaging the trigger 61 of a normally open limit switch LS-2 mounted on side plate 11 adjacent the upper rearward edge thereof. It will be seen that such engagement will be effected at the completion of the return travel of the carton strippers 48 or 48', as the case may be.

Also carried upon arm 53 is another normally open limit switch LS-4, having a trigger 62 engageable by a lug 63 extending forwardly from backing plate 12 for termination of downward travel of elevator E, thereby causing same to be stopped at its full lower position (as shown in full lines in Figure 2). Housing rear wall 7 at its upper end edge is bent forwardly and downwardly to provide a short inclined tongue 64 which is substantially planarwise parallel to housing top wall 9 and to which is hingedly mounted the upper end of a slide or ramp plate 65, the lower or forward end of which is free; said ramp plate 65 being of such length that when in its downwardly swung position its lower end will be received upon the upper flange of a channel shaped side frame 66 of a discharge conveyor, generally indicated D', mounted upon top wall 9 of housing 4, and extending thereacross (see Figures 1 and 3). Integral with ramp plate 65 and extending downwardly from the underface thereof is an arm 67 to the lower end of which is secured one end of an extension spring 68; the other end of said spring 68 being attached to conveyor D' whereby ramp plate 65 is biased into upper position (see Fig. 2). Mounted on the forwardly presented face of the projecting section 7' of wall 7 is a normally closed interlock switch IN-1, having a trigger 69 for engagement by ramp plate 65 when in lowered position, so that by such engagement a circuit open condition will be developed.

Discharge conveyor D' is inclined transversely of its length at the same angle as that of the inclination of top wall 9, namely about 22°, and includes a side frame 70 parallel with side frame 66, but of relatively increased height to provide in its upper portion a carton retaining wall or surface, as at 70'. Said discharge conveyor D' comprises two units, one being a powered roller section, indicated at 71, and the other, a belt conveyor section, designated 72. Conveyor section 71 consists of a plurality of friction rollers 73 journaled at their ends in side frame 66 and the lower portion of side frame 70; said rollers 73 being arranged in upper and lower staggered tiers with a narrow endless belt 74 passing therebetween and trained about a drum 75 mounted on an idler shaft 76 journaled in bearings in side frames 66 and 70 at one end thereof; and about a drum 75' secured on a powered shaft 77 journaled in bearings provided on side frames 66, 70 at a location beyond their intermediate point toward the remote end of conveyor D'. Shaft 77 carries a reduction gear 78 meshing with the drive gear 79 on the drive shaft 80 of an hydraulic motor 81 secured on side frame 66. Rollered conveyor section 71 is operatively coupled with belt conveyor 72 by engagement of gear 78 to a driven gear 82 keyed or otherwise mounted on a shaft 83 journaled in bearings on side frames 66, 70; said shaft 83 mounting a belt roller 84 about which passes one portion of a conveyor belt 85, the upper course of which passes over a support plate 86 (see Figure 14) extending between side frames 66, 70; the other portion of belt 85 being trained about a belt roller 87, mounted on an idler shaft 88 extending between side frames 66, 70 adjacent the proximate end of discharge conveyor D'. It will be noted that driven gear 82 is of less diameter than gear 78, for the belt conveyor 72 will move at a relatively increased speed to thereby provide a speed differential between the conveyor sections 71, 72.

Mounted on the outwardly directed face of side plate 70 by bearings 89 is a rocker shaft 90 having engaged thereto, by means of sleeves 91, the lower ends of a plurality of upwardly projecting rods 92 at the upper ends of which are suitably secured by screws or lugs 93 (see Figure 12), which extend freely through openings 94 formed in upper portion 70' of side frame 70 and are attached at their projecting ends to a switch rail 95 substantially co-extensive with rollered section 71. Connecting an adjacent pair (and preferably a central pair) of rods 92 is a dog 96 engaging the trigger 97 of a normally closed interlock switch IN-2 carried on the outer face of side frame 70. For urging said rail 95 away from side plate 70 and hence, biasing dog 96 into engagement with switch IN-2 is a coil spring 98, one of its ends being attached to said dog 96 and the other end being secured to side frame 70. Thus, upon force being applied to rail 95, driving same against side frame 70, as by a carton delivered onto rollered conveyor section 71, which force is sufficient to overcome spring 98, rocker shaft 90 will be rotated to cause dog 96 to be moved outwardly away from switch IN-2 resulting in circuit-open condition, for reasons to be described.

Projecting laterally from side frame 66 near the point of mounting of driven gear 82 is a bracket 99 carrying a bearing 100 in which is suitably journaled a vertically presented pintle 101, the upper end of which extends above side frame 66 and mounts a sleeve 102 for adjustably receiving a switch arm 103, axially normal to said pintle 101 and of such length as to extend above the upper course of belt conveyor 72 for interjection into the path of cartons carried therealong, with their greatest dimensions being presented crosswise of the conveyor. On the lower end of pintle 101 is a plate cam 104 having an operating edge 105 for engaging a trigger 106 of a normally open switch 107; there being a coil spring 108 engaged at one end to said cam, at its other end to a bracket 109 on side frame 66 for urging pintle 101 into such position that switch arm 103 will be disposed in an axially perpendicular manner with respect to belt conveyor 72 with cam 104 being so related to switch 107 as to maintain same in open condition. In circuit with said switch 107 is a solenoid 110 mounted on side frame 70 having an armature 111 pivotally engaged to a carton deflector 112 presented beneath support plate 86 and extending at one end laterally therebeyond for hinged attachment to a bracket 113 provided on side frame 70 (see Figure 14). An opening 114 is provided in support plate 86 for reciprocal movement therethrough of the other end of deflector 112 on upward movement of armature 111 upon energization of solenoid 110. Switch arm 103 is of such length that the distance from its inner end to side plate 70 is such as to permit unimpeded movement therebetween of cartons wherein the width of the same is less than the distance between said switch arm 103 and side frame 70. However, said switch arm 103 is adapted to be contacted by cartons which are presented so as to have their greatest dimension crosswise of the belt conveyor and hence, to cooperate with deflector 112 to effect a 90° turning of said cartons. The carton contacting switch arm 103 will cause same to be swung, overcoming the force of spring 108 to thereby effect rotation of cam 104 in the direction of the arrow shown in Figure 15, whereupon switch 107 will be closed, resulting in the energization of solenoid 110. This, in turn, causes deflector 112 to be moved upwardly through opening 114 into the path of the carton and the deflector 112 will be maintained in such position as long as the circuit is closed, which will be co-extensive with the period in which switch arm 103 is engaged by the carton and hence maintained in swung position. It should be recognized that switch arm 103 is adapted for over travel so as to allow passage of the carton after same has been turned. The portion of the carton striking deflector 112 is detained thereby, with the same acting as a fulcrum since the undetained or other portion of such carton will be carried along by the belt conveyor 72 and hence, turned through an arc of 90°. (See Figure 3.) As soon as the carton shall have lost contact with switch arm 103 the latter will be restored by operation of spring 108 to initial position, with consequent opening of switch 107 and de-energization of solenoid 110, will return downward movement of deflector 112.

Mounted on the inner face of housing side walls 5, 5', immediately beneath the upper end of top wall 9 are aligned bearings 115, 115' respectively, for journaling of a rocker shaft 116 whereon is fixed a pair of generally S-shaped, spaced apart rocker arms 117, 117' which at their lower ends are engaged to a reinforcing, connecting rod 118. Operatively engaging connecting rod 118, as by a clevis member 119, is the upper end of the piston 120 of a fluid cylinder 121 pivotally mounted at its lower end on a bracket 122 extending from the inner face of housing rear wall 7. The upper and rearwardly projecting ends of rocker arms 117, 117', extend through openings 123, 123', respectively, formed in the upper portion 7' of housing rear wall 7 beneath tongue 64; and secured on said projecting ends is a carton clamping or stabilizing bar 124 of angle shape, having a vertical leg 125 for engaging the forwardly directed surfaces of cartons c on the pallet p to be unloaded, and horizontal leg 126 normally overlying tongue 64 and effectively providing an extension of ramp plate 65 when bar 124 is in operative or rearwardly rocked position, as shown in dotted lines in Figure 9. Upon flow of fluid to the lower end of said cylinder 121 piston 120, which has a relatively short stroke, will be moved upwardly causing shaft 116 to turn so as to move rocker arms 117, 117' toward housing rear wall 7, with the upper ends thereof being carried to their point of maximum projection through openings 123, 123', thereby presenting carton clamping or stabilizing bar 124 against the adjacent ends of the cartons in the next to top tier of cartons on the pallet to be unloaded (see Figure 2). As the cartons c on the upper tier are slidingly impelled thereacross under impetus of the carton strippers 48 or 48', the next to top tier of cartons will be stabilized and hence prevented from moving with the upper tier through friction. It will be noted that as the cartons in the top tier are stripped they will move across the horizontal flange 126 of stabilizing bar 124 for delivery onto slide or ramp plate 65.

Mounted upon connecting rod 118 is a depending dog 127 for engaging the trigger 128 of a normally open limit switch LS-3 secured on the inner face of housing rear wall 7.

Conveniently located within housing 4 is a prime mover or motor M drivingly connected by its shaft to a pump P for a hydraulic fluid system comprising cylinders 16, 16', 121 and hydraulic motor H to be described in more detail hereinbelow. Also driven by motor M through means of a drive belt 129 is a hydraulic pump R for continuously delivering fluid to hydraulic motor 81 for constant operation of discharge conveyor D' when motor M is running. Associated with the hydraulic system is the customary fluid reservoir 130.

*Electrical system*

With reference now being made to the wiring diagram shown in Figure 20, the normally open limit switches LS-1, LS-2, LS-3, and LS-4 are in parallel, with their load sides connected by conductor 300 to a solenoid or electro-magnet 301 of a stepping switch, designated generally at 302; there being the customary pawl and ratchet wheel (not shown) for operatively connecting the armature of solenoid 301 with a switch wiper arm 304 for sequentially engaging stationary terminals or contacts C-1, C-2, C-3, C-4 . . . C-22, and C-23, preferably arranged in a semi-circular bank. Solenoid 301 is in circuit by a lead 305 to the positive terminal of a rectifier 131 of the full wave or bridge type for converting the alternating current of the source to direct current for the operation of a direct current control circuit, as broadly indicated at D. The opposite or line sides of limit switches LS-1, LS-2, LS-3, and LS-4 are connected by a conductor 306 to the lead 307 between the negative side of rectifier 131 and wiper arm 304.

Switch terminals C-1, C-2, C-3, C-4 . . . and C-22 are connected respectively through leads 308, 309, 310 and 311, to the solenoid coils of relay switches 312, 313, 314, and 315, the other sides of said coils having a common connection, namely, lead 320, to lead 305. Interposed in series in lead 309 between terminal C-2 and solenoid coil of relay switch 313 are the normally closed interlock switches IN-1, IN-2. The load sides of relay switches 312, 313, 314, and 315 are respectively connected to solenoids 316, 317, 318, and 319 for actuating the valve of a pump P for purposes to be described. Said solenoids 316, 317, 318 and 319 are connected by a conductor 321 to the source of alternating current through a motor starter and disconnect switch 322. The line sides of relay switches 312, 313, 314 and 315 have a common connection to lead 323 to the alternating current source. Said relay switches enable the direct current control circuit D to operate an alternating current control circuit C and, hence, ultimately, the valves of pump P.

Terminal C-23 on stepping switch 302 is connected by a lead 324 to a normally open, homing push-button switch 325 connected to a conductor 300 by lead 326. Rectifier 131 is connected to the secondary winding of a transformer 327 which reduces the line voltage of the alternating current source to the potential required by said rectifier 131 to produce a desired direct current voltage for control circuit D. The primary winding of said transformer 327 is connected to the alternating current source of switch 322.

The operation of the circuit will now be described: Assuming elevator E to be in its bottom or lowermost position (full lines, Figure 2) wiper arm 304 will be in contact with terminal C-23 (as indicated by the dotted lines at Figure 20) whereby no element in the direct current control circuit D is energized. To commence operation of the system the operator, after having closed switch 322, will close push button switch 325 thereby completing the circuit to solenoid 301 so that through operation of the pawl and ratchet, wiper arm 304 will lose engagement at one of its ends with terminal C-23 and make contact at its other end with terminal C-1, causing current to flow through conductor 308, energizing the solenoid coil of relay switch 312, effecting energization of pump solenoid 316; whereupon, as described more fully hereinbelow, hydraulic fluid will be pumped to the lower end of elevator fluid cylinders 16, 16', with the result that elevator E will start its ascent and continue such until limit switch LS-1 is momentarily closed by the first or lowermost lug 56 on upright 57. The triggering of limit switch LS-1 energizes stepping switch solenoid 301 with a pulse of current, thereby causing wiper arm 304 to lose contact with terminal C-1 and to be brought into contact with terminal C-2. By this operation a discontinuance of the flow of fluid will be brought about with respect to elevator cylinders 16, 16', arresting the movement of elevator E since relay switch 312 will be open, de-energizing solenoid 316. However, relay switch 313 will then be closed energizing pump solenoid 317 whereby the valves of pump P will be operated to cause fluid to flow to hydraulic motor H for operative movement of the carton strippers 48, 48' and simultaneously, fluid will be delivered to the lower end of the clamping bar cylinder 121 for outward movement of clamping bar 124 into carton stabilizing or operative position. Hydraulic motor H will continue its operation (except for the action of interlock switches IN-1, IN-2, as will be described) until the returning stripper member 48 or 48' causes limit switch LS-2 to be triggered by engagement thereof with lug 60.

The cartons c which have been unloaded by strippers 48, 48' pass over ramp plate 65 onto discharge conveyor D'. As ramp plate 65 is depressed under the load of the cartons it swings against spring 68 downwardly and effects engagement with interlock switch IN-1 opening the circuit of relay switch 313 thereby causing solenoid 317 to be de-energized, resulting in the stoppage of hydraulic motor H. As the cartons pass from plate 65 onto discharge conveyor D' they will, through gravity, push against rail 95 actuating interlock switch IN-2 which also opens the circuit of relay switch 313 and effects stoppage of hydraulic motor H so that the stripping action is arrested as long as cartons c are either on ramp plate 65 or abutting against rail 95. The circuit to relay switch 313 will be re-established when all cartons have been cleared to belt conveyor section 72 with ramp plate 65 and rail 95 having been returned to their normal position under influence of the related springs 68, 98 respectively and interlock switches IN-1 and IN-2 are again closed, with the consequent re-energization of solenoid 317 and resumption of operation of hydraulic motor H to continue the carton stripping action for removal of the remaining rows of cartons on the tier being stripped.

The triggering of limit switch LS-2 by engagement with lug 60 will likewise send a pulse of current to stepping switch solenoid 301 causing wiper arm 304 to advance to the next terminal, namely, contact C-3, resulting in the de-energizing of solenoid 317 with operation of hydraulic motor H being stopped and closure of relay switch 314 being effected with consequent energization of solenoid 318. This latter will bring about operation of the pump valves to cause fluid flow to the top of clamping bar cylinder 121 returning the clamping bar 124 to inoperative or withdrawn position, that is, out of engagement with the cartons on the pallet to be unloaded. The return rocking of rocker arms 117, 117' will present dog 127 for engagement with trigger 128 of limit switch LS-3 causing momentary closure of the same so that a pulse of current is delivered to stepping switch solenoid 301 with wiper arm 304 thereby losing contact with terminal C-3 and being advanced to the next position therebeyond, namely, terminal C-4 with attendant de-energization of solenoid 318 and commencement of repetition of the described cycle.

It will be seen that the sequence hereinabove described will be followed in the removal of an entire tier of cartons c from the pallet p being unloaded so that upon such removal the next step will be to effect upward movement of elevator E in order to present the next tier for stripping. This cycle will be repeated as often as there are tiers of cartons to be removed. Consequently, each cycle will require three terminals on the stepping switch 302 corresponding to, and connected in multiple with, terminals C-1, C-2, and C-3 in order to actuate relay switches 312, 313 and 314 in the required sequence for unloading successive tiers. Thus, for instance, if the pallet to be unloaded were to have 7 tiers of cartons then there would be 21 terminals, three for each tier, on the switch 302 connected to relays 312, 313, and 314 as C-1, C-2 and C-3, are connected and in multiple with the latter. However, since the cycle is repetitive, it is deemed unnecessary to repeate the description of the same for each tier; and hence, that for a single cycle has been deemed adequate to fully inform as to the following operations: the upward movement of elevator E, the stopping of same, the operation of hydraulic motor H, together with that of carton strippers 48, 48' and clamping bar 124, as described above.

After the last tier of cartons c upon elevator E has been stripped therefrom and the elevator is at its uppermost point of travel, bearing an empty pallet p; momentary closure of limit switch LS-3 at the end of the last unloading operation will cause switch wiper arm 304 to be advanced into engagement with terminal C-22 which completes the circuit of relay switch 315 with consequent energizing of pump solenoid 319; the latter causing fluid to flow into the upper ends of elevator fluid cylinders 16, 16' with simultaneous drainage from the lower ends thereof, so that elevator E will be caused to move downwardly. The descent of elevator E will continue until at the lower limit of its travel, limit switch LS-4 is triggered by engaging lug 63, whereupon a pulse of current will again be delivered to stepping switch solenoid 301 moving wiper arm 304 into engagement with end terminal C-23, stopping elevator E in position for receiving the next loaded pallet for unloading. With wiper arm 304 in contact with terminal C-23, the direct current control circuit D will be open, with all components thereof in de-energized state. Closure as by manual operation, of homing switch 325 will thus reactivate the system for unloading of the pallet.

*Hydraulic system*

In Figures 21 to 26 the operation of the hydraulic fluid system of the present invention is schematically shown. Solenoids 316, 317, 318 and 319 are mounted on pump P for operating the valves thereof. It will be seen that the armatures of solenoids 316 and 319 are connected to opposite extremities of a cross bar 330 which is centrally pivotally engaged on a frame member f. Between the point of attachment of the armature of solenoid 319 and the pivot point there is engaged to bar 330 one end of a connecting link 331, the other end of which is swingably connected to the end of a valve rod 332 upon which are mounted valve cylinders 333 and 334 of a pump valve Z (Figure 22). Pump valve cylinder 333 is positioned for coaction with ports 335, 335a and 335b, with port 335 being connected to a supply pipe for delivery therethrough of fluid from pump P. Port 335a is connected through a conduit 336 with the upper end of elevator fluid cylinders 16, 16' while port 335b is in communication through a pipe or conduit 337 with the lower ends of said cylinders 16, 16'. Pump valve cylinder 334 is positioned for coaction with ports 338, 338a and 338b; port 338 being connected with a drain pipe 339 leading to the fluid reservoir R; port 338a being connected by a branch conduit 340 with the conduit 337; while port 338b is connected by a branch conduit 341 with conduit 336. Said valve cylinders 333 and 334 are biased by a spring 342 so that when solenoids 316 and 319 are simultaneously in de-energized condition (see Figure 21), all ports will be closed. Upon energizing of solenoid 316 through the means hereinabove described in connection with the wiring system, the armature thereof will be retracted (see Figure 22) and thus effect a withdrawing of valve rod 332 to cause valve cylinder 333 to block port 335a, so that pressure fluid may flow from pump P through ports 335 and 335b for delivery of fluid to the lower ends of cylinders 16, 16' for upward travel of elevator E. Upon de-energizing of solenoid 316 both the pump and drain ports 335, 338 will be closed as valve cylinders 333, 334 under influence of spring 342 are disposed in closed position, so that elevator E will be stopped at its particular juncture of ascent. During the operation of machine A solenoid 316 will be, as described above, periodically energized to progressively admit pressure fluid to elevator cylinders 16, 16' for travel of elevator E to its uppermost position. Upon energization of solenoid 319 by closure of limit switch LS–4 in the manner described, valve rod 332 will be driven inwardly (as will be seen in Figure 23) to cause valve cylinder 333 to close port 335b thereby allowing flow of fluid from pump P through conduit 336 to the upper end of elevator fluid cylinders 16, 16', while valve cylinder 334 will close port 338b to permit the fluid in the lower end of cylinders 16, 16' to drain through ports 338a and 338 to reservoir R, and thereby, effect return or downward travel of elevator E in its lower position.

A similar system is involved in the operation of pump solenoids 317 and 318 shown schematically in Figures 24, 25 and 26; the said solenoids having their armatures connected through a pivoted cross bar 343, eccentric link 344 and valve rod 345 to valve cylinders 346 and 347 of a valve 348. Said valve cylinder 346 cooperates with ports 349, 349a and 349b; port 349 being connected to a supply pipe for delivery therethrough of the fluid from pump P while port 349a is connected by a pipe 350 to the upper end of clamping bar cylinder 121, with port 349b being connected through a conduit 351 to hydraulic motor H. Valve cylinder 347 cooperates with ports 352, 352a and 352b; said port 352 being connected to the reservoir R while port 352a is in communication by conduit 353 with the lower end of clamping bar cylinder 121. Said conduit 353 opens into conduit 351 for purposes presently appearing. Port 352b is connected by a branch pipe 354 to pipe 350. It will thus be seen that upon energizing of solenoid 317 (see Figure 25) valve cylinder 346 will close port 349a so that pressure fluid will flow from pump P through conduit 351 and also through conduit 353 so that simultaneously hydraulic motor H will be actuated and fluid will be delivered to the lower end of clamping bar cylinder 121 for driving the piston 120 thereof upwardly. Contemporaneously, valve cylinder 347 will close port 352a so that fluid may drain through conduits 350 and 354 and ports 352b and 352 to the reservoir R from the upper end of clamping bar cylinder 121. Upon energization of solenoid 318 (see Figure 26) valve cylinder 346 will close port 349b and valve cylinder 347 will close port 352b, in which relationship fluid may flow from pump P through ports 349, 349a to the upper end of clamping bar cylinder 121, the lower end of which will drain through pipe 353 and ports 352a, 352 to reservoir R. It must be noted that hydraulic motor H does not have a return line through pump P but is connected directly by pipe 355 to reservoir R as motor H operates in but one direction.

*Résumé of operation*

In view of the foregoing, it will be seen that a pallet p having a load of non-cubic cartons c arranged in tiered, locked formation (as shown in Figure 3) is fed through opening B in any suitable manner onto rollered platform of elevator E which is in its lower position with the platform in inclined attitude, as shown in Figure 19. The operator will then close switch 322 and homing switch 325, as discussed above, so as to effect upward movement of elevator E. Upon the engagement of limit switch LS–1 by the lowermost lug 56 on upright 57 elevator E will be stopped whereupon the top or uppermost tier of cartons c will be disposed immediately above horizontal flange 126 of clamping bar 124, so that the same may be moved thereacross upon operation of strippers 48, 48'. One stripper 48 or 48' will be at the rearward end of the lower course of endless chains 41, 41' poised for forward or operative travel, when the tier of cartons to be removed is so positioned, while the other stripper 48 or 48' will be at the forward end of the upper course of endless chains 41, 41' preparatory to the return portion of the cycle. Thus, the then operative carton stripper 48 will effect engagement between its bar 49 and the cartons in the rearmost row of the tier to be removed and hence, upon operation of motor H will exert a forward pushing action on the whole tier. The forwardmost row will thus be driven downwardly over ramp plate 65 and onto discharge conveyor D'. Since ramp plate 65 is forced downwardly interlock switch IN–1 will be opened, whereby the carton removing or stripping action will be momentarily discontinued until ramp plate 65 and conveyor section 71 are both cleared. Thus, by the operation of interlock switches IN–1 and IN–2 only a single row of cartons will be handled at one time. This effectively prevents any undesired piling or jamming of cartons to take place, for if the carton strippers 48, 48' were not arrested or caused to dwell the entire tier of cartons would be forced downwardly toward discharge conveyor D' resulting in an obstructive overloading of cartons c on conveyor D' with complete blockage of operation resulting. Furthermore, the inclination of discharge conveyor D' is of extreme importance for it causes a quick and reliable downward displacement of the cartons so as to remove same from any untoward contact with those in the row next succeeding the tier being stripped.

As shown in Figure 3, such cartons are customarily in locked formation so that some cartons will be transferred to conveyor section 71 in axial alignment therewith, while others will be axially normal thereto. The ones which are axially normal will hence extend a greater distance toward the remaining cartons to be removed than the ones which are axially parallel so that a relatively small extent of clearance is present. Accordingly, the inclination of conveyor section 71, with its downward component, assures adequate clearance. It should be pointed out that although reference has been made herein to rows of cartons the same, when locked, are not actually in uniform rows due to the locking character of the stacking pattern.

Cartons c thus transmitted to the end of belt conveyor section 72 are all in axially aligned relationship as by operation of switch 107 and deflector 112, and are thence discharged onto a conveyor section 400, which is transversely, progressively turned through an arc of 22° for connecting discharge conveyor D' with a standard, horizontally presented, rollered industrial conveyor 401.

After the top tier of cartons c has been delivered to discharge conveyor D', limit switch LS–2 will be then momentarily closed by lug 60 on the returning carton stripper 48 or 48', as the case may be, so that, as described above, elevator E will be caused to resume its upward travel until the next lug 56 on upright 57 has closed limit switch LS–1. In this connection it must be noted that the spacing between the lugs 56 on upright 57 correspond with the height of the cartons to be removed so that elevator E will travel the requisite distance for presenting each tier for proper stripping action. Since a machine A would desirably be utilized for use with cartons of more than one height it is to be considered a part of the present invention that lugs 56 on upright 57 may be disposed thereon in any desired vertical spacing so as to accommodate cartons of varying height, as making same removable and hence insertable within spaced openings (not shown). If desired, a single upright having about its periphery a plurality of series of lugs with varying spacings could be provided, with such upright being rotatable so as to present the requisite series of lugs in position for triggering limit switch LS–1.

After unloading of the pallet p the same may be removed from the lowered elevator E by a forklift truck or may be readily discharged to a pallet stacking machine of the type disclosed in United States Letters Patent No. 2,792,950 issued to Frank W. Fenton and Harold L. Bock, on May 21, 1957; with the discharge to such machine being effected by the pushing of the now empty or unloaded pallet by an incoming loaded pallet.

It should be understood that changes and modifications in the formation, construction, arrangement, and combination of the several parts of the pallet unloading machine may be made and substituted for these herein shown and described without departing from the nature and principle of my invention.

Having thus described my invention, what I claim and desire to secure by Letters Patent is:

1. A pallet unloading machine comprising a frame, a ramp-forming plate hingedly mounted in the upper portion of said frame for downward swinging under load, an elevator adapted to support a load-bearing pallet having containers or the like disposed in rowed tiers thereon, means for effecting vertical travel of said elevator from the lower portion of said frame to the upper portion thereof to present the uppermost tier for delivery to said ramp plate, means adapted to operate in timed sequence to stoppage of the elevator for pushingly removing the uppermost tier of containers from the load and onto the ramp plate, and a fixed discharge conveyor section disposed downwardly and outwardly of said ramp plate for receiving the containers from the ramp plate, said discharge conveyor section and ramp plate having a combined width greater than the greatest dimension of the containers being unloaded, said discharge conveyor sections being presented in axially parallel relation to the axis of the rows of containers to be unloaded, said discharge conveyor section being further inclined transversely with its side proximate the ramp plate being higher than its other side and with its length being at least as great as the length of one row of containers on the pallet to be unloaded for simultaneously accommodating the number of row-constituting containers.

2. A pallet unloading machine comprising a frame, a ramp-forming plate hingedly mounted in the upper portion of said frame, an elevator adapted to support a load-bearing pallet having containers or the like disposed in rowed tiers thereon, means for effecting vertical travel of said elevator from the lower portion of said frame to the upper portion thereof to present the uppermost tier for delivery to said ramp plate, a pusher member for engaging the containers in the uppermost tier for effecting transfer of the same from the load on to the ramp plate, power means for said pusher member, means for actuating said power member to effect operation of said pusher member in timed sequence to stoppage of the elevator, and a discharge conveyor section located spaced downwardly and outwardly of said ramp plate for receiving containers passing therefrom, said discharge conveyor section being inclined transversely and axially normal to the direction of travel of said pusher member, said discharge conveyor section being aligned with said ramp plate during movement across the latter of containers delivered thereto by the pusher member, the combined widths of said discharge conveyor section and ramp plate being greater than the maximum dimension of the containers being unloaded whereby obstructing contact is prevented between containers on a discharge conveyor section and those at the point of discharge.

3. A pallet unloading machine comprising a frame, a ramp-forming plate hingedly mounted in the upper portion of said frame for downward swinging under load, means for normally biasing said ramp plate upwardly, an elevator adapted to support a load-bearing pallet having containers or the like disposed in rowed tiers thereon, means for effecting vertical travel of said elevator from the lower portion of said frame to the upper portion thereof to present the uppermost tier for delivery to said ramp plate, a pusher member for engaging the containers in the uppermost tier for effecting transfer of the same from the tiered load to the ramp plate causing same to be swung downwardly, a first switch engageable by said ramp plate on downward swinging for circuit opening, power means for said pusher member, said first switch and said power means being connected in circuit so that operation of the latter will be arrested while said ramp plate is in downwardly swung position, a discharge conveyor section presented downwardly and outwardly of said ramp plate and being inclined transversely with its side proximate the ramp plate being higher than its side remote therefrom, said discharge conveyor section having its longitudinal axis normal to the path of movement of the pusher member, a container abutment surface extending upwardly from the remote side of said discharge conveyor section in inclined relation to the vertical, a second switch engageable by containers traveling along said surface for opening the current to said power means, whereby discharging of containers to the ramp plate is arrested while containers are disposed upon the discharge conveyor section.

4. A pallet unloading machine comprising a frame, a ramp-forming plate hingedly mounted in the upper portion of said frame, an elevator adapted to support a load-bearing pallet having containers or the like tiered thereon, means for effecting vertical travel of said elevator from the lower portion of said frame to the upper portion thereof to present the uppermost tier for delivery to said ramp plate, a pusher member for engaging the containers in the uppermost tier for effecting transfer of the same from the load on to the ramp plate, power means for said pusher member, means for actuating said power member to effect operation of said pusher member in timed sequence to stoppage of the elevator, and a discharge conveyor section located spacedly downwardly of said ramp plate for receiving containers passing therefrom, said conveyor section having its longitudinal axis normal to the direction of travel of said pusher member, and being transversely inclined with its upper side being proximate the ramp-forming plate and its other or lower side remote outwardly therefrom, the axis of said conveyor section being normal to the path of movement of the pusher member and the width of said conveyor section being at least as great as one side of the load upon the pallet to be unloaded.

5. A pallet unloading machine as described in claim 4 wherein a container abutment surface-forming member is presented upwardly extendingly from the lower side of said discharge conveyor section in inclined relation to the vertical for travel thereagainst of containers on the discharge conveyor section switch means are associated with said discharge conveyor section, a switch-actuating member resiliently mounted on the container-confronting face of said abutment member for engagement by containers delivered thereagainst to effect switch-open condition, said switch and said power means being operatively connected so that said pusher member will be arrested while containers are disposed on said conveyor.

6. A pallet unloading machine comprising a frame, a ramp-plate hingedly mounted on the upper portion of said frame for downward swinging under applied load, means for normally biasing said ramp plate upwardly, means for supporting a load-bearing pallet having containers or like articles tiered thereon to present the uppermost tier for delivery on to said ramp plate, a pusher member for advancing the uppermost tier of containers from the load and on to said ramp plate whereby said latter is forced downwardly, a discharge conveyor disposed for receiving containers from said ramp plate, a first interlock switch means located for engagement by said ramp plate upon downward swinging thereof, a second interlock switch associated with said discharge conveyor section for actuation by containers received on said conveyor, power means for effecting operation of said pusher member, said power means, and first and second interlock switches being operatively connected whereby upon engagement of either or both of said switches said power means will be arrested so that operation of the pusher member will be discontinued while containers are either on said ramp plate or discharge conveyor section.

7. In a pallet unloading machine, a frame, an elevator adapted to support a pallet loaded with containers or like articles stacked thereon in tiered arrangement, means for effecting vertical travel of said elevator, a pusher member provided on said frame above said elevator for reciprocal movement to advance on its operative stroke the uppermost tier of containers from the load, power means for operating said pusher member, a switch carried on said elevator, a plurality of vertically arranged switch-actuating lugs mounted on said frame for successively engaging said switch during travel of said elevator, said lugs being spaced apart a distance substantially equivalent to the height of the individual containers stacked on the pallet, said switch being operatively connected to the elevator operating means and said power means whereby said elevator will be periodically stopped during its upward travel and said pusher member will be activated in timed sequence to each stoppage of the elevator.

8. In a pallet unloading machine, a frame, an elevator adapted to support a pallet loaded with containers or like articles stacked thereon in tiered arrangement, a source of fluid under pressure, first fluid means for effecting vertical travel of said elevator, a pusher member mounted on said frame above said elevator for reciprocal travel in a direction normal to that of the travel of the elevator for advancing on its operative stroke the uppermost tier of containers from the load, second fluid means for effecting operation of said pusher member, pump means, said first and second fluid means connected by said pump to said source of fluid, a switch carried on said elevator, a lug mounted on said frame for engaging said switch upon travel of said elevator, said switch being operatively connected to said pump means whereby upon engagement of said switch said first fluid means will be arrested and said second fluid means actuated with consequent stoppage of said elevator and operation of said pusher member in timed relationship thereto.

9. In a pallet unloading machine as described in claim 8, a second switch mounted on said frame, a lug carried on said pusher member for engaging said switch on the return or inoperative stroke of said pusher member, said second switch being also operatively connected to said pump means whereby upon engagement of said second switch, the operation of second fluid means will be stopped.

10. A unit unloading machine comprising a frame, having a horizontal edge portion for defining a discharge point, unit support means provided in said frame for presentation of the units adjacent the discharge point, a discharge conveyor section located below and outwardly of said discharge point, said conveyor section being inclined transversely of its length in downwardly and outwardly inclined attitude with respect to the discharge point, power means for moving said units from said support means past said discharge point for reception thereof by the discharge conveyor section, and a switch member physically associated with said discharge conveyor section for actuation by units received on said conveyor section, said power means and said switch member being interconnected so that upon actuation of said switch member operation of the unit moving means will be arrested while units are disposed on said discharge conveyor section.

11. A unit unloading machine as described in claim 10 and characterized by said unit support means being horizontally disposed, said discharge conveyor section having a width slightly greater than the greatest dimension of the units being received thereon for accommodating same in any attitude.

12. A unit unloading machine as described in claim 10 and further characterized by said discharge conveyor section having its side proximate the frame being more elevated than its opposite side, a unit abutment surface extending upwardly from the said opposite side of said discharge conveyor section in inclined relation to the vertical, and said actuating means for arresting operation of the unit moving means being mounted on said abutment surface.

13. A unit unloading machine as described in claim 10 and further characterized by said discharge conveyor section being powered and with its transverse inclination at an angle of 22 degrees to the vertical.

14. A unit unloading machine comprising a frame having a horizontal edge portion for defining a discharge point, a ramp-forming plate hingedly mounted on said frame at said discharge point for downward swinging under load, unit support means provided in said frame for presentation of said units at the discharge point, means for moving said units over said support means and onto said ramp plate, and a discharge conveyor section disposed outwardly and below said ramp plate, said discharge conveyor section being axially normal to the direction of travel of said units in moving onto said ramp plate and being inclined transversely of its length with its side proximate the ramp-plate being higher than its opposite side.

15. A unit unloading machine as described in claim 14 and further characterized by means for normally biasing said ramp-forming plate in upwardly presented position, said ramp-forming plate being of such extent that its outer edge will be brought into abutment upon the adjacent side portion of the discharge conveyor section when said ramp-forming plate is in downwardly swung position under load of units moving thereacross.

16. A unit unloading machine comprising a frame, a ramp-forming plate hingedly mounted on said frame for extension therebeyond and for downward swinging under load, means for normally biasing said ramp-forming plate in upward position, unit support means provided adjacent said ramp plate for presentation of units to be unloaded thereto, unit moving means for effecting transfer of the same from the support means to the ramp plate, a first switch engageable by said ramp-forming plate on downward swinging under load for circuit opening, power means for said unit moving means, said first switch and said power means being connected in circuit so that operation of the latter will be arrested while said ramp plate is in downwardly swung position, a discharge conveyor section presented downwardly and outwardly of said ramp-forming plate, and being inclined transversely of its length, with its side proximate the ramp-forming plate being higher than its side remote therefrom, said discharge conveyor section having its longitudinal axis normal to the path of movement of the unit moving means, a second switch provided on said discharge conveyor section for engagement by units traveling therealong for opening the circuit to said unit moving means whereby delivery of said units to the ramp-forming plate is arrested while units are disposed upon the discharge conveyor section.

17. A unit unloading machine as described in claim 16 and further characterized by said unit support means being disposed horizontally, and unit abutment surface extending upwardly from the side of said discharge conveyor section remote from said ramp-forming plate, said second switch being mounted upon said abutment surface.

18. A unit unloading machine comprising a frame, a ramp plate hingedly mounted on said frame for downward swinging under applied load, means for normally biasing said ramp plate upwardly, unit support means provided in said frame for presentation of the units for unloading to the ramp plate, unit moving means for advancing the units from the support means and onto the ramp plate, whereby the latter is forced downwardly under such load, a discharge conveyor section disposed for receiving units from said ramp plate, a first interlock switch located for engagement by said ramp plate upon downward swinging thereof, a second interlock switch associated with said discharge conveyor section for actuation by units received on said conveyor section, power means for effecting operation of said unit moving means, said power means and said first and second interlock switches being operatively connected whereby upon engagement of either or both of said switches, said power means will be arrested so that operation of the unit moving means will be discontinued while units are either on said ramp plate or on said discharge conveyor section.

19. A unit unloading machine comprising a frame having a horizontal edge portion for defining a discharge point, a ramp-forming plate hingedly mounted on said frame at said discharge point for downward swinging under load, unit support means provided in said frame for presentation of said units at the discharge point, power means for moving said units over said support means and onto said ramp plate, a discharge conveyor section disposed outwardly of said ramp plate, a switch carried on said conveyor section for actuation by units received thereon, said power means and said switch being operatively connected, whereby upon actuation of said switch said power means will be arrested so that operation of the unit moving means will be discontinued while units are disposed on said conveyor section.

20. A unit unloading machine comprising a frame, a ramp-forming plate hingedly mounted on said frame for extension therebeyond and for downward swinging under load, means for normally biasing said ramp-forming plate in upward position, unit support means provided adjacent said ramp plate for presentation of units to be unloaded thereto, unit moving means for effecting transfer of the same from the support means to the ramp-forming plate, a switch engageable by said ramp-forming plate on downward swinging under load for circuit opening, power means for said unit moving means, said switch and said power means being connected in circuit so that operation of the latter will be arrested while said ramp-forming plate is in downwardly swung position, and a discharge conveyor section presented outwardly of said ramp-forming plate.

References Cited in the file of this patent

UNITED STATES PATENTS

| | | |
|---|---|---|
| Re. 23,103 | Newcomer | Apr. 26, 1949 |
| 2,314,632 | Rear | Mar. 23, 1943 |
| 2,338,048 | Minaker et al. | Dec. 28, 1943 |
| 2,479,396 | Nelson | Aug. 16, 1949 |
| 2,500,437 | Tandler et al. | Mar. 14, 1950 |
| 2,608,609 | Fitch | Aug. 26, 1952 |
| 2,644,734 | Gabrielsen | July 7, 1953 |
| 2,650,333 | Taylor | Aug. 25, 1953 |
| 2,761,542 | Pagdin | Sept. 4, 1956 |
| 2,765,102 | Yohn et al. | Oct. 2, 1956 |
| 2,774,489 | Guigas | Dec. 18, 1956 |
| 2,815,846 | Stevenson | Dec. 10, 1957 |